Patented Jan. 24, 1950

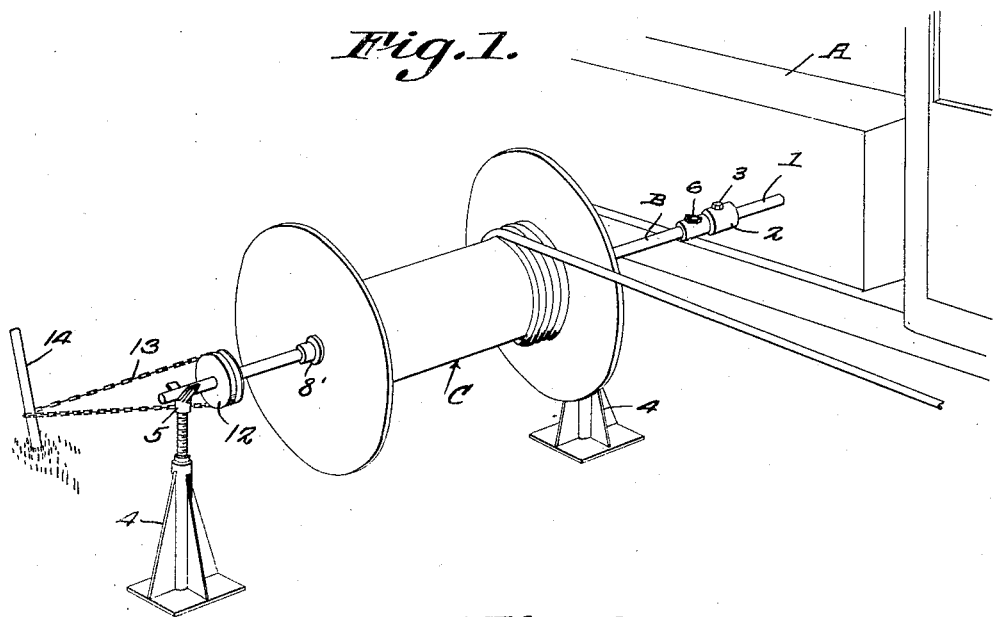
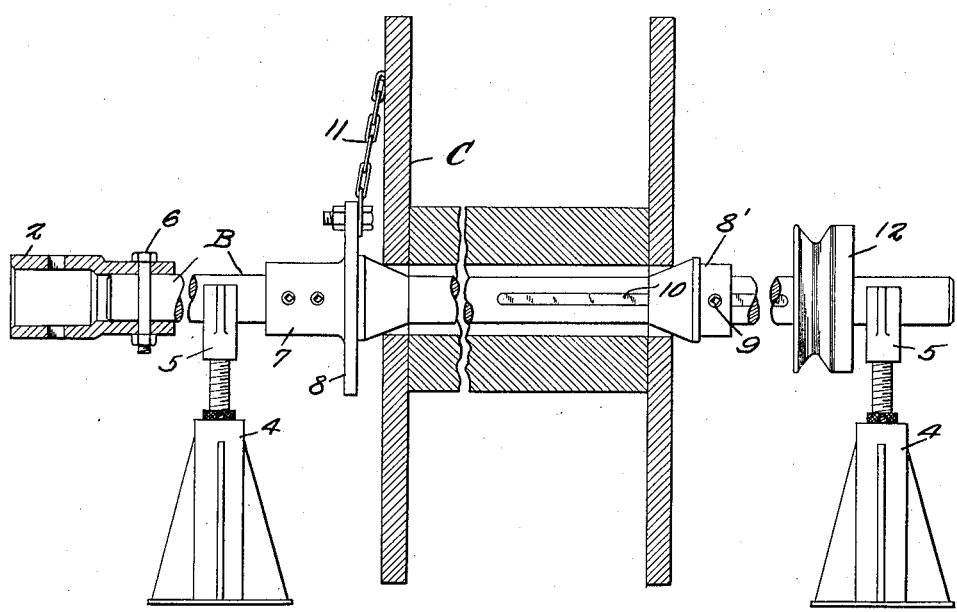

2,495,425

UNITED STATES PATENT OFFICE 2,495,425

POWER-DRIVEN CABLE WINDING DEVICE

Aage V. Schultz and Thomas H. Tomlonson,
La Porte, Ind.

Application August 7, 1947, Serial No. 767,088

2 Claims. (Cl. 254—186)

This invention relates to new and useful improvements in winding and reeling devices and more particularly and specifically to a power driven cable winding drum designed for portable use with standard utility line trucks.

The primary object of this invention resides in the provision of a cable winding drum and a portable mounting assembly therefor which is designed to be driven from the power take off of a standard utility line truck.

Another object of this invention lies in the provision of a winding drum and a mounting assembly therefor which can be quickly and easily mounted and demounted adjacent a line truck, for use at any time and at any desired locality to wind or unwind line cable, which is composed of standard equipment carried by the truck.

Still another object of this invention is the provision of a cable winding drum and supporting assembly therefor which utilizes a minimum of parts and accessories and which are of an extremely simple, durable, and inexpensive design and construction.

Still further improvements and advantages of this invention will readily appear to those skilled in the art when the following description is read in the light of the accompanying drawings in which:

Fig. 1 is a perspective view of the drum and assembly.

Fig. 2 is a partial vertical section of a front elevation of Fig. 1.

Referring now to the accompanying drawings which are merely illustrative of the preferred embodiment of this invention and in which like characters indicate similar parts throughout, A designates a standard utility line truck provided with a side extended auxiliary drive shaft 1 having a coupling sleeve 2 secured to the extended end thereof by a shear bolt 3 or the like.

A pair of conventional lift jacks 4, with Y-shaped heads 5 are adjusted to the same height and placed in spaced apart relationship in alignment with the shaft 1.

An elongated shaft B is secured, by a second shear bolt 6, in the coupling 2 with the shaft rotatably supported across the spaced jacks 4 in their Y-shaped heads 5.

A fixed cone 7 is secured upon the shaft B intermediate the shaft length adjacent the coupled end thereof and the cone is provided with an enlarged circular flange 8 formed circumferentially thereabout.

A spool type cable drum C is inserted upon the outer end of the shaft B and moved to a wedged fit on the cone 7. A second cone 8, which is axially adjustable on the shaft by a set stud 9 carried thereby engaging a keyed groove 10 in the shaft, is moved to a wedge position at the outer end of the drum to firmly support the drum C on the shaft B.

A driving chain 11 securely interconnects the cone flange 8 and the outer circumferential portion of the adjacent drum end to provide a power drive for the drum with rotation of the shaft B and the fixed cone 7.

Thus when the shaft and drum support are assembled as illustrated and described the drum may be driven from the utility line truck to reel or unreel cable from any desired location and in any direction.

An additional feature of this invention lies in securing a grooved pulley type wheel 12 on the outer portion of the shaft B so that it may carry a circular line 13 tensionally about an anchored point 14 thus stabilizing the entire assembly well under strenuous operation.

Having thus described and explained the construction and function of this invention and with full belief that modifications in size, materials, and other general characteristics which fall within the scope of the appended claims do not constitute a departure from the spirit of this invention, what we desire to claim is:

We claim:

1. A cable winding and reeling device for attachment to the power take-off shaft of a power device, a supporting shaft, a stationary cone mounted on the shaft, an auxiliary adjustable cone mounted on the shaft, a cable drum mounted on the shaft resting on the cones, a flexible connecting member between the drum and one of said cones, transmitting movement of the shaft to the drum when the shaft rotates, portable adjustable bearing members supporting the shaft and in which the shaft rotates winding a cable on the drum, and means for securing the supporting shaft to the power take-off shaft.

2. A cable winding and reeling device for attachment to the power take-off shaft of a power device, comprising a supporting shaft, a stationary cone mounted on the shaft, an auxiliary adjustable cone mounted on the shaft, a cable drum mounted on the shaft and resting on the cones, a chain having one of its ends connected to the stationary cone, the opposite end of the chain being connected to the drum adjacent to the periphery thereof, transmitting movement of the supporting shaft to the drum, bearing members in which the supporting shaft is mounted, and means for connecting the supporting shaft to the power take-off shaft of a power device.

AAGE V. SCHULTZ.
THOMAS H. TOMLONSON.

REFERENCES CITED

The following references are of record in the file of this patent:

UNITED STATES PATENTS

| Number | Name | Date |
|---|---|---|
| 1,709,506 | Wallace et al. | Apr. 16, 1929 |
| 1,884,183 | Pearson | Oct. 25, 1932 |
| 2,163,010 | Richards et al. | June 20, 1939 |

FOREIGN PATENTS

| Number | Country | Date |
|---|---|---|
| 480,980 | France | July 25, 1916 |
| 686,646 | France | Apr. 15, 1930 |
| 690,972 | France | June 30, 1930 |